(12) United States Patent
Uchida

(10) Patent No.: US 9,779,046 B2
(45) Date of Patent: Oct. 3, 2017

(54) ELECTRONIC APPARATUS AND PORT CONTROL METHOD FOR LOCKING DOWNSTREAM USB PORTS

(71) Applicant: Kabushiki Kaisha Toshiba, Minato-ku, Tokyo (JP)

(72) Inventor: Katsuhiro Uchida, Ome (JP)

(73) Assignee: Kabushiki Kaisha Toshiba, Tokyo (JP)

(*) Notice: Subject to any disclaimer, the term of this patent is extended or adjusted under 35 U.S.C. 154(b) by 438 days.

(21) Appl. No.: 14/458,817

(22) Filed: Aug. 13, 2014

(65) Prior Publication Data

US 2015/0058509 A1  Feb. 26, 2015

Related U.S. Application Data

(60) Provisional application No. 61/868,679, filed on Aug. 22, 2013.

(51) Int. Cl.
| | |
|---|---|
| *G06F 12/00* | (2006.01) |
| *G06F 13/362* | (2006.01) |
| *G06F 9/44* | (2006.01) |
| *G06F 9/52* | (2006.01) |
| *G06F 21/74* | (2013.01) |
| *G06F 21/85* | (2013.01) |

(52) U.S. Cl.
CPC ......... *G06F 13/362* (2013.01); *G06F 9/4411* (2013.01); *G06F 9/52* (2013.01); *G06F 21/74* (2013.01); *G06F 21/85* (2013.01); *G06F 2221/2147* (2013.01); *Y02B 60/1228* (2013.01)

(58) Field of Classification Search
USPC ............................ 710/200, 107–108, 15–17
See application file for complete search history.

(56) References Cited

U.S. PATENT DOCUMENTS

| | | | |
|---|---|---|---|
| 2002/0062416 A1 | 5/2002 | Kim et al. | |
| 2006/0208097 A1 | 9/2006 | Ando et al. | |
| 2008/0244108 A1* | 10/2008 | Abramson | .......... G06F 13/4291 710/16 |
| 2008/0270652 A1* | 10/2008 | Jeansonne | ............... G06F 21/53 710/108 |

FOREIGN PATENT DOCUMENTS

| | | |
|---|---|---|
| JP | 2002-163047 A | 6/2002 |
| JP | 2002-244795 A | 8/2002 |
| JP | 2003-140784 A | 5/2003 |
| JP | 2005-182462 A | 7/2005 |
| JP | 2007-316946 A | 12/2007 |

* cited by examiner

*Primary Examiner* — Raymond Phan
(74) *Attorney, Agent, or Firm* — Knobbe, Martens Olson & Bear LLP

(57) ABSTRACT

A method of an embodiment enables locking of downstream ports of a USB hub controller in an electronic apparatus. The method includes the determination step, the assertion step and the lock step. The determination step determines, with a BIOS, whether a lock setting has been made on each of the downstream ports. The assertion step performs, with the BIOS, assertion control for resetting the USB hub controller. The lock step performs, with the BIOS, lock control during the assertion control based on whether the lock setting has been made.

3 Claims, 5 Drawing Sheets

ELECTRONIC APPARATUS AND PORT CONTROL METHOD FOR LOCKING DOWNSTREAM USB PORTS

CROSS-REFERENCE TO RELATED APPLICATION(S)

This application claims priority from US Provisional Patent Application No. 61/868,679 filed on Aug. 22, 2013, the entire contents of which are incorporated herein by reference.

TECHNICAL FIELD

An embodiment of the present invention relates to an electronic apparatus and a port control method.

BACKGROUND ART

There is a request for security control using a so-called USB (Universal Serial Bus) (registered trademark, hereinafter omitted) security function of a USB hub. The USB security function prevents individual USB-connected devices from being used by other users.

Generally, the number of USB ports tends to decrease as the number of chips is reduced. Therefore, a built-in USB hub controller may be used to satisfy the number of external USB ports and the number of built-in USB device connections. There is also a request for the support of the USB security function for this case.

According to the existing USB security function on USB ports, for example, a port Enable/Disable register is set disable for each USB port located in a USB host controller, so that the USB security function are obtained for each port (on the other hand, external USB ports may be set collectively).

On the other hand, since downstream ports of the USB hub are made disable not individually but collectively, flexible security control may not be performed.

DESCRIPTION OF EMBODIMENT

An embodiment will be described below with reference to FIGS. 1 to 5.

Figure 1:
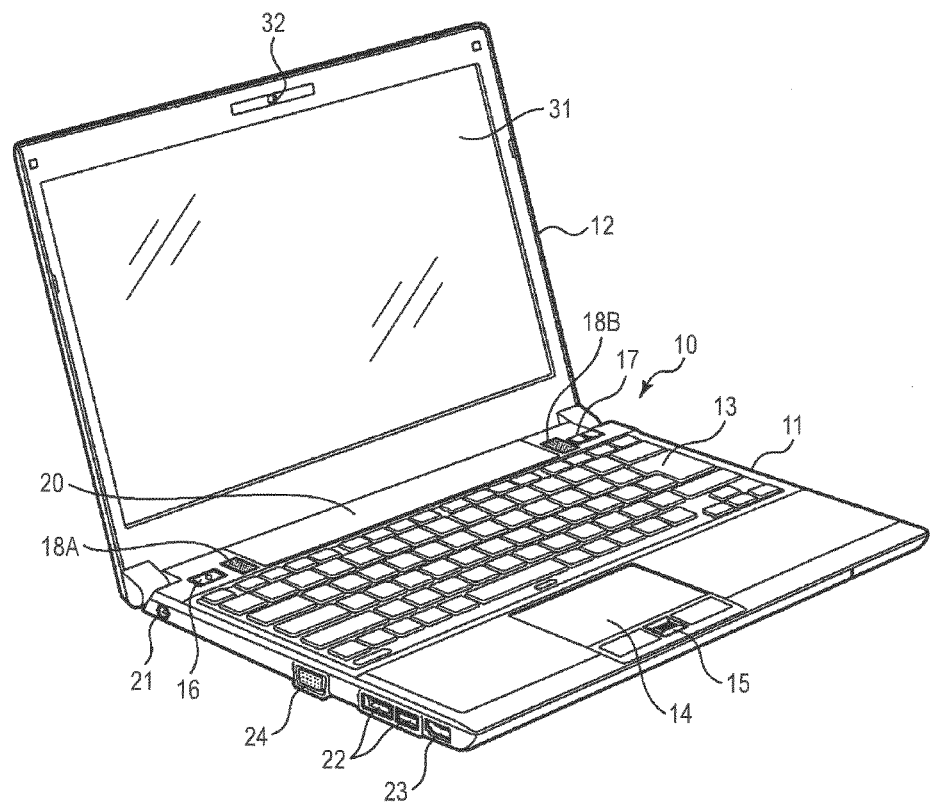
FIG. 1 is view showing the external configuration of an electronic apparatus according to the embodiment.

FIG. 1 is a view showing the external configuration of an electronic apparatus according to the embodiment. For example, the electronic apparatus may be implemented as a notebook type personal computer, a tablet terminal, a desktop type personal computer, etc. The following description will be made on the assumption that the electronic apparatus is implemented as a notebook type personal computer 10.

FIG. 1 is a perspective view in which the computer 10 whose display unit is open is seen from its front side. The personal computer 10 includes a computer body 11 and a display unit 12. A display device such as a liquid crystal display (LCD) 31 is embedded into the display unit 12. A camera (Web camera) 32 is disposed in an upper end portion of the display unit 12.

The display unit 12 is attached to the computer body 11 so as to be rotatable between an open position and a closed position. In the open position, the upper surface of the computer body 11 is exposed. In the closed position, the upper surface of the computer body 11 is covered with the display unit 12. The computer body 11 has a thin box-like housing. A keyboard 13, a touch pad 14, a fingerprint sensor 15, a power switch 16 for powering on/off the personal computer 10, some function buttons 17, and speakers 18A and 18B are disposed on the upper surface of the computer body 11.

A power supply connector 21 is provided in the computer body 11. The power supply connector 21 is provided in a side surface, for example, a left side surface of the computer body 11. An external power supply apparatus is removably connected to the power supply connector 21. An AC adaptor may be used as the external power supply apparatus. The AC adaptor is a power supply apparatus for converting an external commercial power supply (AC power) into DC power.

A battery 20 is removably attached to, for example, a rear end portion of the computer body 11. The battery 20 may be a battery which is built in the personal computer 10.

The personal computer 10 is driven by electric power supplied from the external power supply apparatus or electric power supplied from the battery 20 (AC power-driven or battery-driven). When the external power supply apparatus is connected to the power supply connector 21 of the personal computer 10, the personal computer 10 is driven by electric power from the external power supply apparatus. The electric power from the external power supply apparatus is used for charging the battery 20. When the external power supply apparatus is not connected to the power supply connector 21 of the personal computer 10, the personal computer 10 is driven by electric power from the battery 20.

The computer body 11 includes some USB ports 22, an HDMI (registered trademark, hereinafter omitted) (High-Definition Multimedia Interface) output terminal 23 and an RGB port 24.

Figure 2:
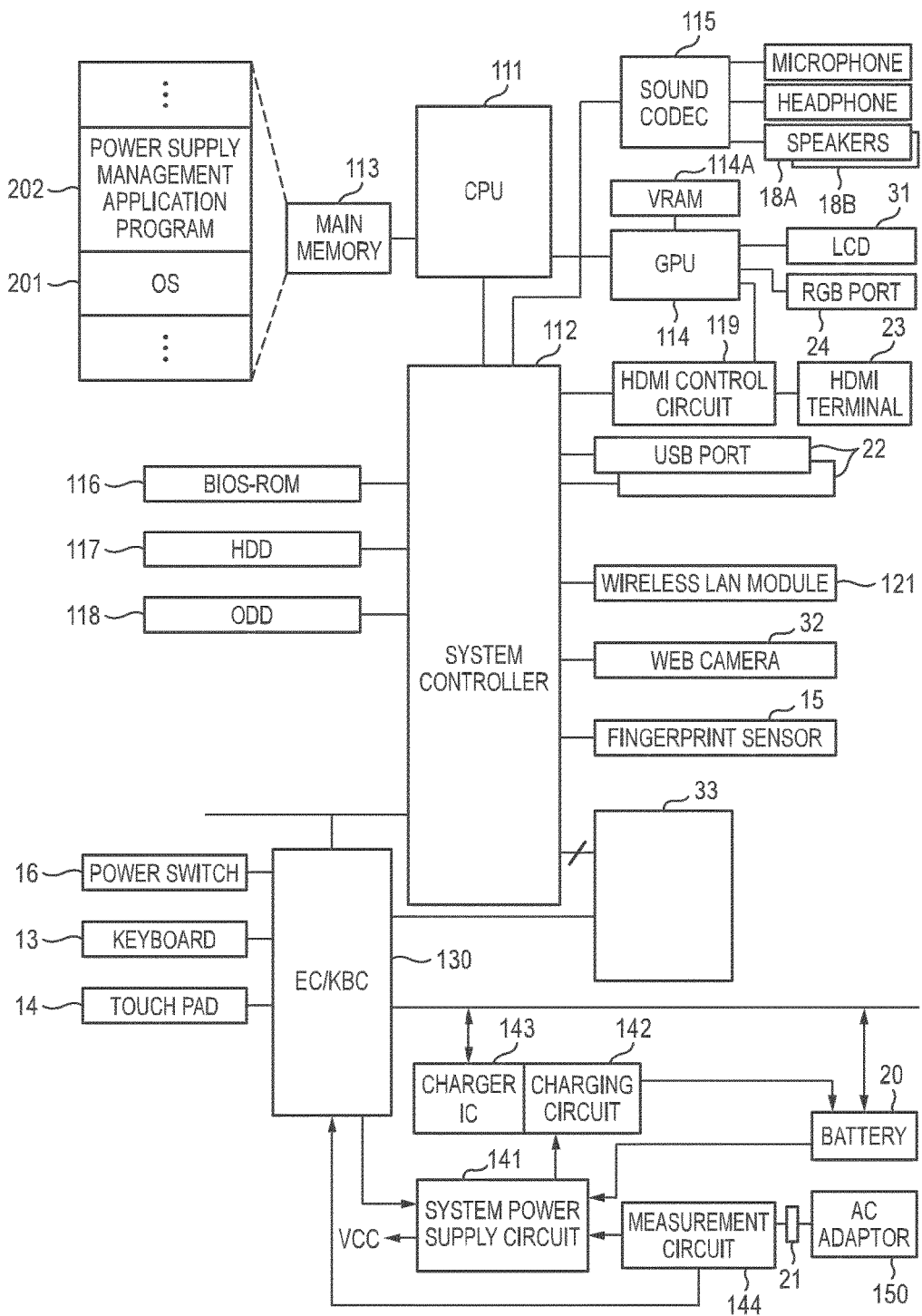
FIG. 2 is diagram showing the system configuration of a personal computer 10 in the embodiment.

FIG. 2 shows the system configuration of the personal computer 10 in the embodiment. The personal computer 10 includes a CPU 111, a system controller (I/O controller) 112, a main memory 113, a graphics processing unit (GPU) 114, a sound codec 115, a BIOS-ROM 116, a hard disk drive (HDD) 117, an optical disk drive (ODD) 118, a wireless LAN module 121, an embedded controller/keyboard controller IC (EC/KBC) 130, a system power supply circuit 141, a charging circuit 142, a charger IC 143, a measurement circuit 144, etc.

The CPU 111 is a processor for controlling the operation of each component of the personal computer 10. The CPU 111 executes various programs loaded onto the main memory 113 from the HDD 117. The programs include an operating system (OS) 201 and various application programs. The application programs include a power supply management application program 202. The power supply management application program 202 is a program for providing a peak shift function. The peak shift function is a function for reducing power consumption (power consumption by the AC power drive) during hours in which demand for electric power is high.

The CPU 111 also executes a basic input/output system (BIOS) stored in the BIOS-ROM 116 which is a nonvolatile memory. The BIOS is a system program for controlling hardware.

The GPU 114 is a display controller for controlling the LCD 31 used as a display monitor of the personal computer 10. The GPU 114 generates a display signal (LVDS signal) which should be supplied to the LCD 31 from display data stored in a video memory (VRAM) 114A. The GPU 114 can also generate an analog RGB signal and an HDMI video signal from the display data. The analog RGB signal is supplied to an external display through the RGB port 24. The HDMI video signal (uncompressed digital video signal) and a digital audio signal can be sent out from the HDMI output terminal 23 to the external display through a single cable. An HDMI control circuit 119 is an interface for sending out the HDMI video signal and the digital audio signal to the external display through the HDMI output terminal 23.

The system controller 112 is a bridge device serving for connection between the CPU 111 and each component. The system controller 112 includes a built-in serial ATA controller for controlling the hard disk drive (HDD) 117 and the optical disk drive (ODD) 118.

Devices such as the USB ports 22, the wireless LAN module 121, the Web camera 32 and the fingerprint sensor 15 are connected to the system controller 112.

The system controller 112 executes communication with each device connected through a bus.

The EC/KBC 130 is connected to the system controller 112 through the bus. The EC/KBC 130 is reciprocally connected to the charger IC 143 and the battery 20 through a serial bus.

The EC/KBC 130 is a power management controller for performing power management for the personal computer 10. For example, the EC/KBC 130 is implemented as a one-chip microcomputer including a built-in keyboard controller for controlling the keyboard (KB) 13, the touch pad 14, etc. The EC/KBC 130 has a function of powering on and off the personal computer 10 in accordance with a user's operation on the power switch 16. The control for powering on and off the personal computer 10 is performed on the system power supply circuit 141 by the EC/KBC 130.

The charger IC 143 is an IC for controlling the charging circuit 142 under the control of the EC/KBC 130. The EC/KBC 130, the charger IC 143 and the system power supply circuit 141 are operated by electric power from the battery 20 or an AC adaptor 150 even when the personal computer 10 has been powered off.

Using electric power from the battery 20 or electric power from the AC adaptor 150 connected as an external power supply to the computer body 11, the system power supply circuit 141 generates electric power (operating power supply) to be supplied to each component. The system power supply circuit 141 supplies electric power with which the battery 20 is charged by the charging circuit 142.

Under the control of the charger IC 143, the charging circuit 142 charges the battery 20 with electric power supplied through the system power supply circuit 141.

The measurement circuit 144 measures a current/voltage supplied to the system power supply circuit 141 through the power supply connector 21 (AC adaptor) and informs the EC/KBC 130 of the measured current/voltage.

Figure 3:
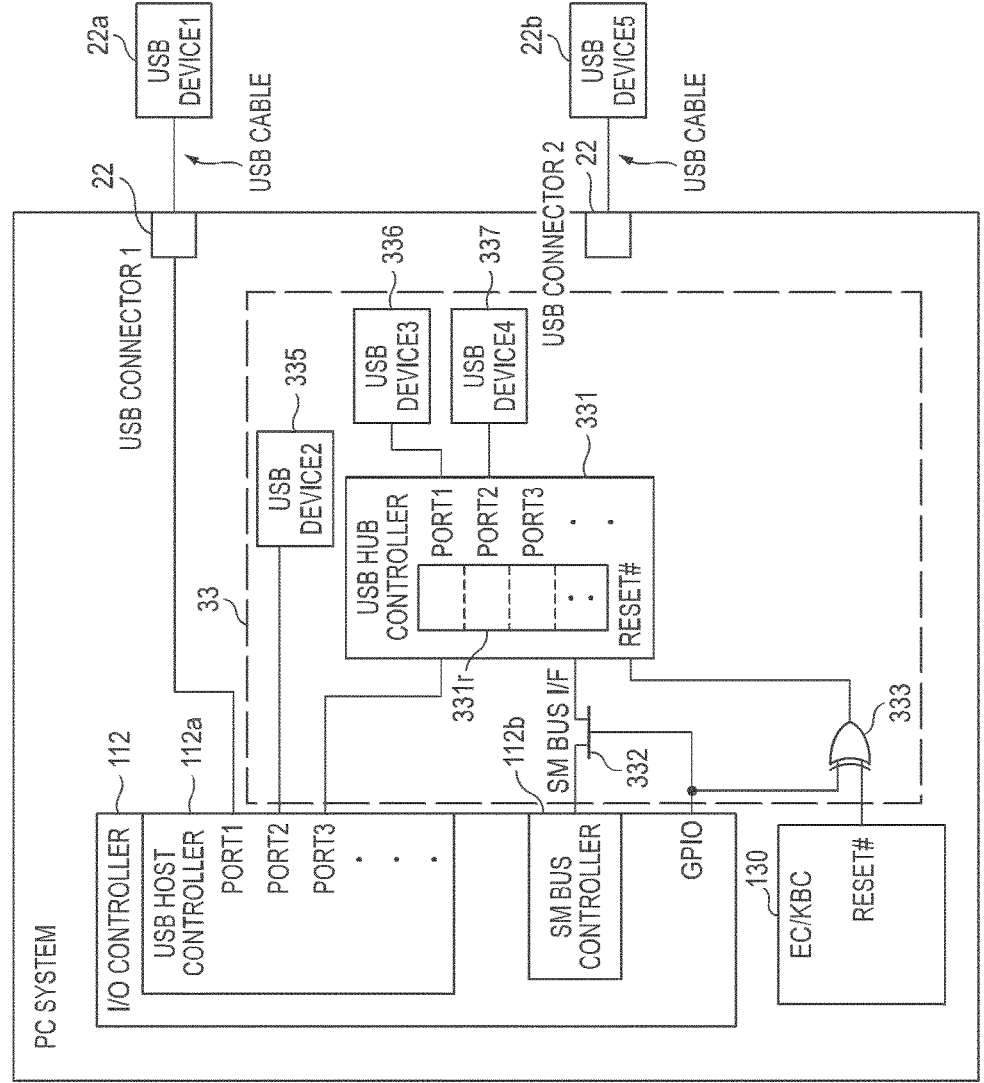
FIG. 3 is configuration diagram showing the related portions of a module associated with a security control function in the embodiment.

The module 33 will be described next with reference to FIG. 3. FIG. 3 is a configuration diagram showing the related portions of the module associated with the security control function in the embodiment.

The I/O controller 112 includes a USB host controller 112a and a System Management bus (SM bus) controller 112b. The I/O controller 112 includes a GPIO.

In the (function) module 33, a USB hub controller 331 is connected to a port 3 of the USB host controller 112a while a USB device (3) 336 and a USB device (4) 337 are connected to a port 1 and a port 2 of the USB hub controller 331 itself. A USB device (2) 335 is connected to a port 2 of the USB host controller 112a.

An output of the SM bus controller 112b is inputted into the USB hub controller 331 through an SM bus I/F 332 while being subjected to gate control of the GPIO. A RESET# (low active) output of the EC/KBC 130 is inputted into RESET# of the USB hub controller 331 while being subjected to an exclusive OR 333 with the GPIO.

A USB device (1) 22a is connected to a USB port 22 (USB connector 1) connected to a port 1 of the USB host controller 112a, and a USB device (5) 22b is connected to a USB port 22 (USB connector 2) connected to one of fourth and following ports of the USB host controller 112a.

In general, this configuration performs the following operations.
(1) After the system power supply is started up, the BIOS initializes the USB ports for USB legacy support prior to the operation of the OS.
(2) After the initialization, the BIOS determines whether the USB security function has been set or not, and sets Port Disable for any port where the USB security function has been set. The setting of the USB security function may be acquired with reference to a setting-up list of the BIOS.

As to the host controller ports, setting may be made to registers provided for each port as in the existing technique. As to the Down Stream ports within a USB hub (USB hub controller 331), setting may be made to a Port Enable/Disable register 331r corresponding to each port within the USB hub is set for a Down Stream port of the USB hub using an SM bus between the I/O controller (I/O controller 112) and the USB hub.
(3) The BIOS asserts (validates) RESET# to the USB hub, and at the same time outputs a signal for performing control to connect the SM bus which is normally in a disconnection state, thereby performing the SM bus communication.
(4) After the termination of the SM bus communication, the BIOS disconnects an SM bus line, and at the same time de-asserts (invalidates) RESET#.

Port Enable/Disable setting on each USB port of the USB hub controller (USB hub controller 331) is typically performed via the SM bus. The SM bus communication may be performed during or just after reset on the USB hub controller. Since the SM bus communication is controlled by the BIOS which is of the PC system, the SM bus communication is performed during BIOS processing at the start-up time of the PC. The Port Disable setting for the USB security function is performed after the USB legacy initializing process of the BIOS. That is, the BIOS resets the USB hub controller during the BIOS processing.

Typically, an SM bus I/F pin of the USB hub controller 331 is often used together for another function. It is therefore necessary connect the SM bus I/F only during SM bus communication.

As to an example of setting to the Enable/Disable register 331r in the aforementioned process (2), it is assumed that an LSI provided with five mode-setting terminals of MODE [4-0] is used as the USB hub controller 331. Among the five mode-setting terminals of MODE [4-0], two mode-setting terminals of MODE [4-3] may be used for setting downstream ports. As an example of simple static setting, setting may be made such that, for example, the downstream ports D3 and D4 of the four downstream ports D1 to D4 are invalidated (while other downstream ports are validated) when LOW is inputted to the mode-setting terminal MODE 4 and LOW is inputted to the mode-setting terminal MODE 3. In addition, setting may be made such that, for example, the downstream port D4 is invalidated (while the other downstream ports are validated) when LOW is inputted to the mode-setting terminal MODE 4=LOW and HIGH is inputted to the mode-setting terminal MODE 3

Also in the case of two inputs, as long as they are realized as SM bus I/F pins, that is, when the LSI is configured such that the number of bits of setting information can be increased by developing and interpreting SMBDAT synchronized with SMBCLK inside the LSI, respective downstream ports can be set individually.

The USB ports are invalidated to thereby activate the USB security function in the following manner.

A switch is inserted into the SM bus between the I/O controller and the USB hub so that the SM bus line can be normally disconnected and make the SM bus I/F pin on the USB hub usable as another function. This switch can be made ON (connection of the SM bus)/OFF by the GPIO (BIOS control) of the I/O controller.

The RESET# control of the USB hub is performed out by the RESET# output from the EC/KBC and the output of an EXOR gate IC of the GPIO (BIOS control) of the I/O controller. Thus, RESET# can be asserted during execution of the SM bus I/F.

Due to the SM bus control on the USB hub, Enable/Disable setting can be made on the downstream ports of the USB hub individually, thereby enhancing the security. When compared with existing techniques in terms of security, in the existing techniques, downstream ports of a USB hub are made disable not individually but collectively, and thus, security control is not flexible. On the other hand, according to the embodiment, downstream ports of a USB hub can be set as Enable/Disable individually via an SM bus. Since an SM bus line can be switched off when the SM bus is not in use, this technique effectively functions also in the case of a multi-function pin having another function than the SM bus.

Figure 4:
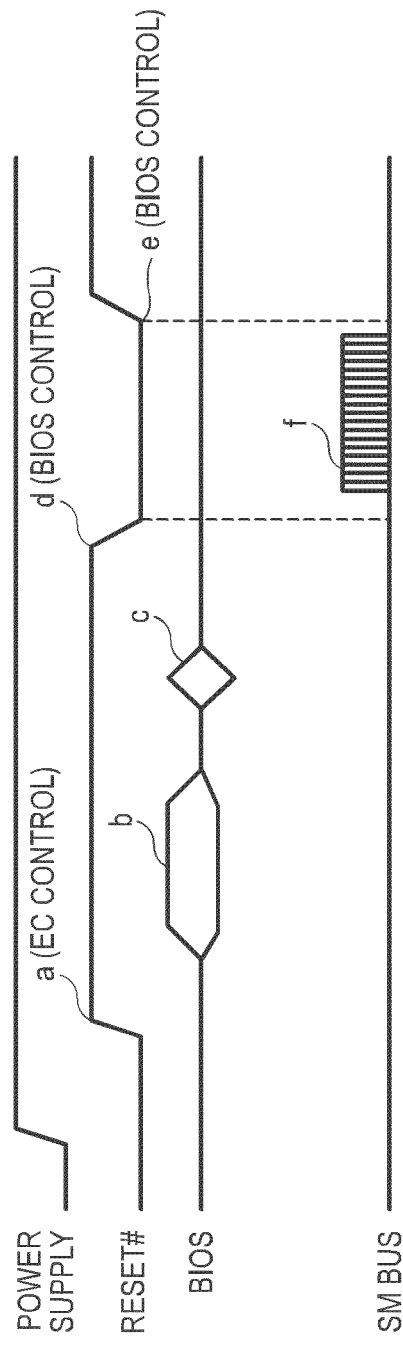
FIG. 4 is timing chart in the embodiment.

FIG. 4 is a timing chart in the embodiment. The abscissa designates time and the ordinate designates rows of signals. After the system power in the top row is started up, RESET# is de-asserted by EC control at timing a. Next, the BIOS performs a legacy initialization process at timing b and a supervisor password confirmation process at timing c.

Next, by BIOS control, RESET# is asserted at timing d, and RESET# is de-asserted at timing e (the BIOS asserts RESET# exclusively of assertion performed by EC). Meanwhile, USB security function setting f is made by the SM bus.

Figure 5:
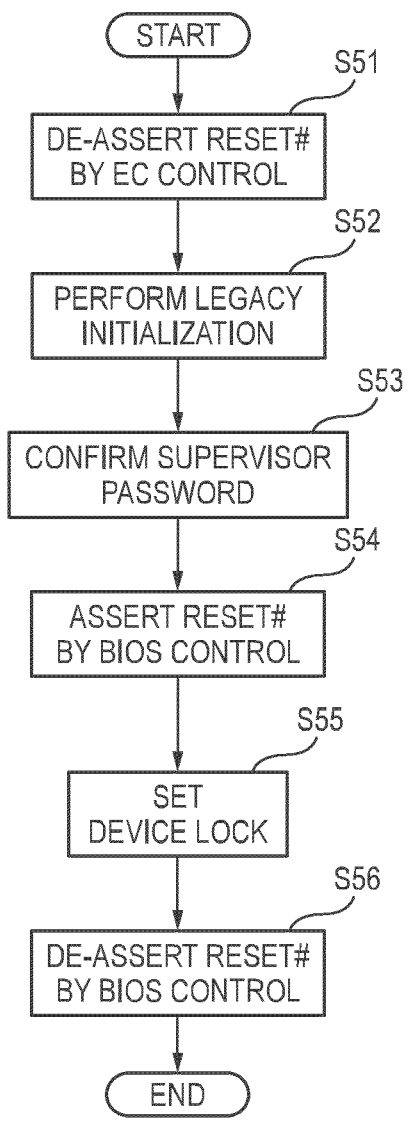
FIG. 5 is flow chart corresponding to FIG. 4 in the embodiment.

FIG. 5 is a flow chart corresponding to FIG. 4 in the embodiment.

Step S51: RESERT# is de-asserted by EC control at timing a after start-up of system power supply.

Step S52: Next, the BIOS performs a legacy initialization process at timing b.

Step S53: The BIOS performs a supervisor password confirmation process at timing c.

Step S54: Next, RESET# is asserted at timing d by BIOS control.

Step S55: Meanwhile, USB security function setting f is performed by the SM bus.

Step S56: #RESET# is de-asserted at timing e.

In this manner, the Port Enable/Disable register of the USB hub is set via the SM bus so that security control can be also performed on each downstream port of the USB hub.

The invention is not limited to the aforementioned embodiment. In addition thereto, the invention may be modified variously in a practical stage without departing from the spirit and scope of the invention. When plural constituent elements disclosed in the aforementioned embodiment are combined suitably, various inventions can be formed. For example, some constituent elements may be removed from the whole constituent elements shown in the embodiment. Constituent elements according to different embodiments may be combined suitably.

The invention claimed is:

1. A port control method for an electronic apparatus, the electronic apparatus comprising:
   an EC/KBC controller configured to send a first signal;
   an I/O controller configured to send a second signal under control by a BIOS for the electronic apparatus;
   a USB hub controller having downstream ports and a reset terminal;
   an SM bus coupling between the I/O controller and the USB hub controller;
   a switch provided on the SM bus and configured to be turned on or off by receiving the second signal, the switch capable of electrically connecting between the I/O controller and the USB hub controller by being turned on and capable of electrically disconnecting between the I/O controller and the USB hub controller by being turned off; and
   an exclusive OR circuit configured to send a third signal obtained through an exclusive or operation of the first signal and the second signal toward the reset terminal of the USB hub controller,
   the port control method comprising:
   determining whether a security lock setting has been made on each of the downstream ports of the USB hub controller under control by the BIOS;
   performing assertion control to validate the reset terminal of the USB hub controller based on the third signal sent from the exclusive OR circuit; and
   performing lock control during the assertion control based on the respective security lock settings to the downstream ports of the USB hub controller, to electrically connect between the I/O controller and the USB hub controller by turning on the switch under control by the BIOS, and if the security lock setting is still not made to at least a part of the downstream ports of the USB hub controller, to make the security lock setting thereto.

2. The port control method according to claim 1, further comprising:
   performing de-assertion control after the lock control, to invalidate the reset terminal of the USB hub controller, and to turn off the switch.

3. An electronic apparatus comprising:
   an EC/KBC controller configured to send a first signal;
   an I/O controller configured to send a second signal under control by a BIOS for the electronic apparatus;
   a USB hub controller having downstream ports and a reset terminal;
   an SM bus coupling between the I/O controller and the USB hub controller;
   a switch provided on the SM bus and configured to be turned on or off by receiving the second signal, the switch capable of electrically connecting between the I/O controller and the USB hub controller by being turned on and capable of electrically disconnecting between the I/O controller and the USB hub controller by being turned off;

an exclusive OR circuit configured to send a third signal obtained through an exclusive or operation of the first signal and the second signal toward the reset terminal of the USB hub controller;

a determination unit configured to determine whether a security lock setting has been made on each of the downstream ports of the USB hub controller under control by the BIOS;

an assertion unit configured to perform assertion control to validate the reset terminal the USB hub controller based on the third signal sent from the exclusive OR circuit; and a lock unit configured to perform lock control during the assertion control based on the respective security lock settings to the downstream ports of the USB hub controller, to electrically connect between the I/O controller and the USB hub controller by turning on the switch under control by the BIOS, and if the security lock setting is still not made to at least a part of the downstream ports of the USB hub controller, to make the security lock setting thereto.

* * * * *